United States Patent
Mizushima et al.

(10) Patent No.: US 8,164,306 B2
(45) Date of Patent: Apr. 24, 2012

(54) BATTERY CHARGE CONTROL DEVICE AND MARINE VESSEL INCLUDING THE SAME

(75) Inventors: Yoshihiro Mizushima, Shizuoka (JP); Shu Akuzawa, Shizuoka (JP); Masaru Suzuki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 414 days.

(21) Appl. No.: 12/512,212

(22) Filed: Jul. 30, 2009

(65) Prior Publication Data
US 2010/0033130 A1  Feb. 11, 2010

(30) Foreign Application Priority Data
Aug. 6, 2008  (JP) ................................ 2008-203398

(51) Int. Cl.
*H02J 7/00*  (2006.01)

(52) U.S. Cl. ......... 320/126; 320/104; 320/116; 320/128

(58) Field of Classification Search .................. 320/126, 320/104
See application file for complete search history.

(56) References Cited

U.S. PATENT DOCUMENTS
5,111,132 A   5/1992  Motose
2006/0125443 A1*  6/2006  Bolduc ....................... 320/104
2008/0129119 A1*  6/2008  Tonicello .................... 307/39
2010/0094490 A1*  4/2010  Alston et al. ................ 701/21

FOREIGN PATENT DOCUMENTS
JP   2002-127990 A   5/2002
JP   2007-110855 A   4/2007

* cited by examiner

*Primary Examiner* — M'Baye Diao
(74) *Attorney, Agent, or Firm* — Keating & Bennett, LLP

(57) ABSTRACT

A battery charge control device for a marine vessel is arranged to control charging of a plurality of batteries, which include a main battery arranged to supply power for operating an engine of a propulsion device, and an accessory battery which is arranged to supply power for devices other than the engine. The main battery and the accessory battery are connected in parallel to a power generator attached to the engine. The charge control device includes a switching element arranged to short-circuit the power generator, a first control unit arranged to execute first control to short-circuit the power generator by driving the switching element when a voltage of the main battery exceeds a first upper limit, in a first control period, and a second control unit arranged to execute second control to short-circuit the power generator by driving the switching element when a voltage of the accessory battery exceeds a second upper limit, in a second control period which is longer than the first control period.

19 Claims, 12 Drawing Sheets

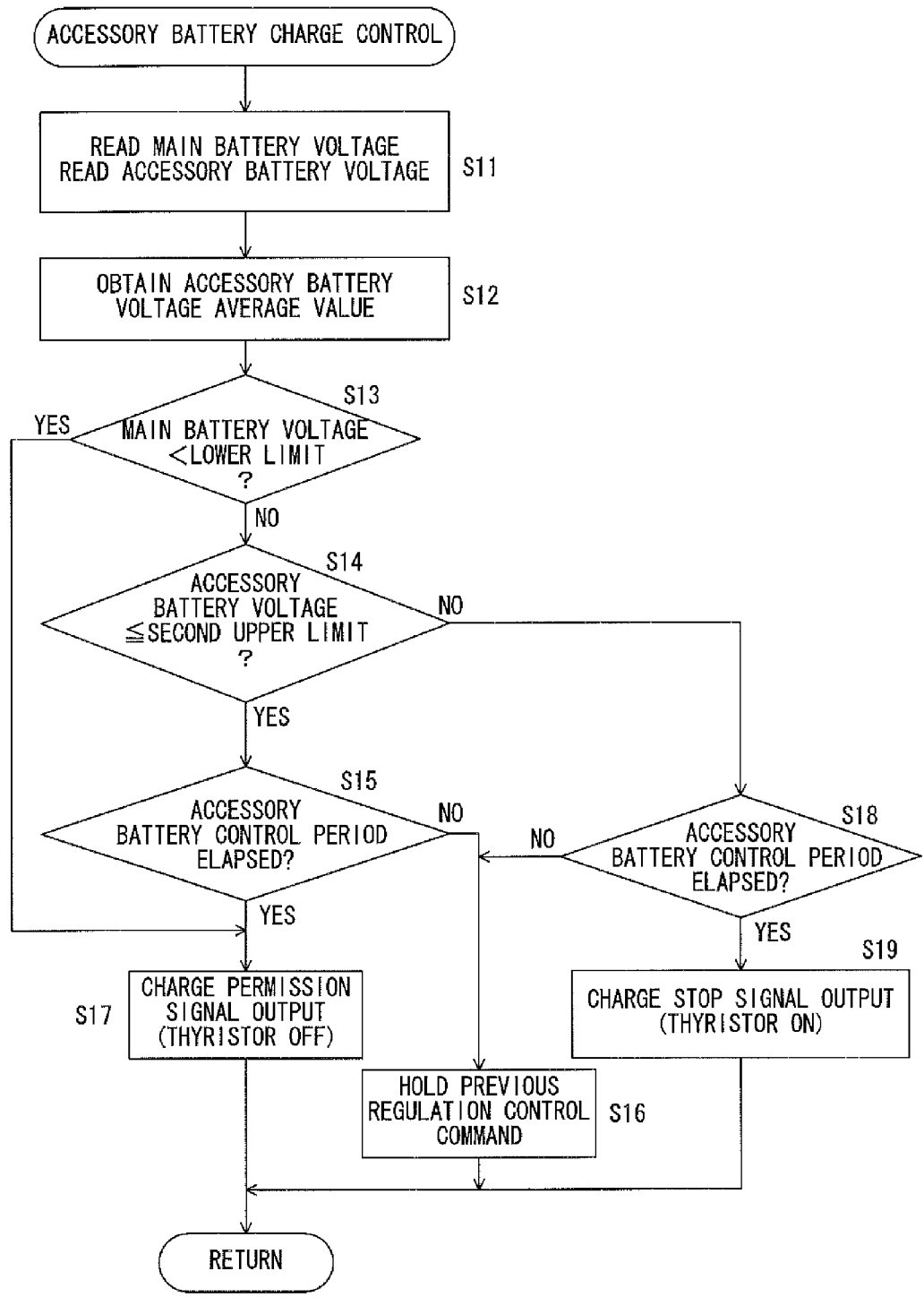

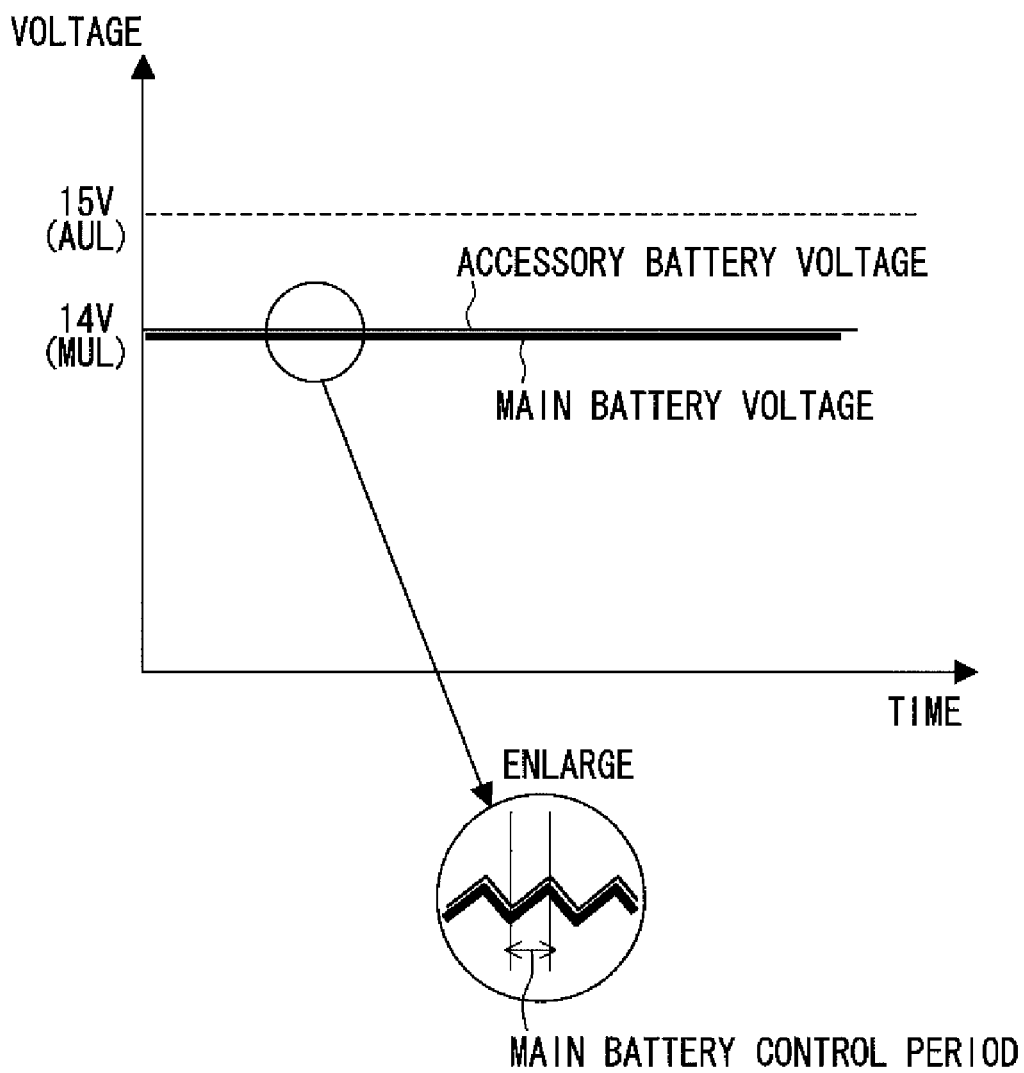

REGULATION BY MICROCOMPUTER BASED ON ACCESSORY VOLTAGE

REGULATION

BATTERY CHARGE CONTROL DEVICE AND MARINE VESSEL INCLUDING THE SAME

BACKGROUND OF THE INVENTION

1. Field of the Invention

The present invention relates to a battery charge control device which charges a battery of a marine vessel by a power generator attached to an engine of a propulsion device. More specifically, the present invention relates to a battery charger which charges a main battery to be used for operations of the engine of the propulsion device and an accessory battery to be used for power supply to devices other than the engine. Further, the present invention relates to a marine vessel including such a battery charger.

2. Description of Related Art

An example of a propulsion device included in a marine vessel is an outboard motor. The outboard motor includes an engine, a propeller to which a driving force is transmitted from the engine, and a power generator attached to the engine. Power necessary for operating the engine is supplied to the outboard motor from a main battery installed in a hull. This main battery is connected to the power generator. During operation of the engine, the main battery is charged by power generated by the power generator.

On the other hand, in a marine vessel, various meters and gauges, a fish finder, a GPS receiver, and other electric components may be provided. Further, in a comparatively large-scaled vessel, an electric range, a microwave, an electric refrigerator, an electric freezer, and other electric devices may be provided in the cabin. To supply power to these devices, an accessory battery may be installed in the hull separately from the main battery. Power of the main battery is used for operating the engine, and power of the accessory battery is supplied to other devices.

U.S. Pat. No. 5,111,132 discloses a charger which commonly charges the main battery and the accessory battery by a power generator provided in the engine of an outboard motor. In this charger, the main battery and the accessory battery are connected in parallel to the power generator. To prevent a current flow between the batteries, a battery isolator using a rectifier circuit is provided. This charger includes a control circuit which stops or regulates charging of the main battery and the accessory battery when a voltage of the main battery or a voltage of the accessory battery reaches a regulation voltage determined in advance.

SUMMARY OF THE INVENTION

The inventors of the present invention described and claimed in the present application conducted an extensive study and research regarding a battery charge control device for a marine vessel, and in doing so, discovered and first recognized new unique challenges and problems as described in greater detail below.

The main battery which supplies power for operating the engine repeats discharge and charge according to operation of a marine vessel. Therefore, the power accumulated in the main battery is definitely consumed. On the other hand, a discharge amount of the accessory battery greatly depends on the way in which the devices provided in the marine vessel are used. Depending on the circumstances, there is a possibility that most of the power accumulated in the accessory battery remains unconsumed and only power for natural discharge is compensated by charge from the power generator.

In this situation, in the configuration of the prior art described above, the main battery may become over-discharged. In other words, when a voltage of the accessory battery reaches the regulation voltage, not only the accessory battery but also the main battery stop being charged. Therefore, as shown in FIG. 9, the accessory battery voltage is left high, and the voltage of the main battery decreases due to discharge. Thus, this may lead to an over-discharged state of the main battery.

This problem becomes more conspicuous in a marine vessel including a plurality of propulsion devices. In this case, a plurality of main batteries corresponding to the plurality of propulsion devices, respectively, are provided. The number of accessory batteries is sufficient at one. The accessory battery is connected to the plurality of power generators provided for the plurality of propulsion devices, respectively. The charger is provided in each of the propulsion devices, so that the accessory battery is charged by the plurality of chargers. However, control voltages (regulation voltages) of control circuits of the plurality of chargers may have variations due to manufacturing tolerance of components, for example. Therefore, in a propulsion device having a control circuit with a comparatively low regulation voltage, the charge in the main battery may become insufficient.

For example, it is assumed that the regulation voltage of a first control circuit corresponding to a first propulsion device is 15V, and the regulation voltage of a second control circuit corresponding to a second propulsion device is 14V. In detail, this situation may arise when the first control circuit reads a battery voltage lower than the actual voltage, and the second control circuit reads a battery voltage properly. In more detail, when the actual battery voltage is 15V, the battery voltage read value read by the first control circuit is 14V. Therefore, as a result, the regulation voltage of the first control circuit becomes 15V. In this case, the accessory battery is charged to 15V by the power generator of the first propulsion device. When a voltage of the accessory battery is kept at 15V, due to the operation of the second control circuit, the charger of the second propulsion device stops the charging operation. Therefore, the main battery corresponding to the second propulsion device is not charged.

To prevent the influence of the accessory battery, it may be considered that voltage detection of the accessory battery is omitted. Accordingly, charge can be regulated based solely on the voltage of the main battery, so that the main battery can be charged without fail. However, depending on the capacity and the charge balance of the accessory battery, the battery voltage of the accessory battery may excessively rise.

In order to overcome the previously unrecognized and unsolved problems described above, a preferred embodiment of the present invention provides a charge control device arranged to control charging of a plurality of batteries installed in a marine vessel. The plurality of batteries includes a main battery which is arranged to supply power for operating an engine of a propulsion device, and an accessory battery which is installed in the marine vessel and is arranged to supply power for devices other than the engine, and the main battery and the accessory battery are connected in parallel to a power generator attached to the engine. The charge control device includes a switching element which is arranged to short-circuit the power generator, a first control unit which is arranged to execute first control to short-circuit the power generator by driving the switching element when a voltage of the main battery exceeds a first upper limit, in a first control period, and a second control unit which is arranged to execute second control to short-circuit the power generator by driving the switching element when a voltage of the accessory battery exceeds a second upper limit, in a second control period longer than the first control period.

In this battery charge control device, the first control unit executes the first control to short-circuit the power generator by driving the switching element when a voltage of the main battery exceeds the first upper limit, in the first control period. The second control unit executes the second control to short-circuit the power generator by driving the switching element when a voltage of the accessory battery exceeds the second upper limit, in the second control period longer than the first control period. By short-circuiting the power generator by the switching element, charging of the main battery and the accessory battery is stopped or regulated.

The second control period is comparatively long, so that the accessory battery voltage can be urged to decrease during regulation by the second control unit. When the accessory battery voltage accordingly becomes not more than the second upper limit, the regulation by the second control unit is released. As a result, continuing of the regulation due to a high accessory battery voltage can be prevented. Accordingly, the chance to charge the main battery can be increased, whereby decrease in voltage of the main battery can be suppressed or prevented.

The second control period may be measured from a timing at which it is detected that the accessory battery voltage has exceeded the second upper limit during charging (during OFF period of the switching element), and from a timing at which it is detected that the accessory battery voltage is not more than the second upper limit during a charge stop (during ON period of the switching element). The second control period may be measured from a timing at which ON/OFF of the switching element is determined based on an accessory battery voltage. In this case, ON/OFF of the switching element is determined based on an accessory battery voltage every predetermined time.

In a preferred embodiment of the present invention, the second upper limit is set to be higher than the first upper limit. Accordingly, it becomes difficult to apply regulation according to a voltage increase in the accessory battery. Therefore, the chance to charge the main battery can be increased, so that the main battery can be prevented from becoming over-discharged (excessive decrease in voltage).

In a preferred embodiment of the present invention, the second control unit is arranged to short-circuit the power generator by driving the switching element when an averaged accessory battery voltage exceeds the second upper limit. Accordingly, driving of the switching element (short-circuiting of the power generator) caused by an accessory battery voltage change in a short time, can be suppressed or prevented. Accordingly, the main battery can be stably charged, so that it can be prevented from becoming over-discharged (excessive decrease in voltage).

Further, in a preferred embodiment of the present invention, the charge control device further includes an invalidating unit which is arranged to invalidate the second control by the second control unit when a voltage of the main battery is less than a lower limit which is lower than the first upper limit. With this configuration, when a voltage of the main battery excessively decreases, the regulation by the second control unit can be invalidated. Accordingly, the main battery can be charged without fail.

Another preferred embodiment of the present invention provides a battery charge control device for a marine vessel, including a first switching element which is arranged to open and close a charging path between the power generator and the main battery, a second switching element which is arranged to open and close a charging path between the power generator and the accessory battery, a first control unit which is arranged to control the first switching element according to the voltage of the main battery, and a second control unit which is arranged to control the second switching element according to the voltage of the accessory battery.

In this battery charge control device for a marine vessel, according to the voltage of the main battery, the main battery can be connected to the power generator by the first switching element. Further, according to the voltage of the accessory battery, the accessory battery can be connected to the power generator by the second switching element. With this configuration, without using a large-sized switch, limited generated power can be distributed to a side requiring the power as needed depending on the situation. In addition, voltages of the batteries can be properly controlled.

In a preferred embodiment of the present invention, the first control unit is arranged to execute first control to open the first switching element when a voltage of the main battery exceeds a first upper limit, and close the first switching element when a voltage of the main battery is not more than the first upper limit, in a first control period. The second control unit is arranged to execute a second control to open the second switching element when a voltage of the accessory battery exceeds a second upper limit, and close the second switching element when a voltage of the accessory battery is not more than the second upper limit, in a second control period.

In a preferred embodiment of the present invention, the marine vessel includes a plurality of the propulsion devices, and a plurality of the main batteries are provided corresponding to the plurality of propulsion devices, respectively, and each main battery is charged by a power generator attached to the engine of a corresponding propulsion device, and the one accessory battery is charged by the plurality of power generators attached to the engines of the plurality of propulsion devices.

In this case, preferably, for each of the plurality of propulsion devices, the first control unit, the second control unit, and the switching element are provided.

Control voltages (first upper limits) of the plurality of first control units may vary due to a manufacturing tolerance of the components of these control units and other factors. Control voltages (second upper limits) of the plurality of second control units may also vary due to a manufacturing tolerance of the components of these control units and other factors. In this case, the accessory battery is charged by a power generator corresponding to a control unit which has a comparatively high control voltage, so that the voltage of the accessory battery becomes comparatively high.

Even in this situation, by setting the first control period of the first control units longer than the second control period of the second control units, the chance to charge each main battery can be increased. Further, by providing switching elements individually for the main batteries and the accessory battery and controlling charging, the main batteries can be charged without fail.

Further, in a preferred embodiment, a plurality of the second control units provided in the plurality of propulsion devices, respectively, are arranged to exchange information with each other and adjust driving timings of the switching elements. In detail, the plurality of second control units synchronize the driving timings of the switching elements by, for example, unit-to-unit communication. Accordingly, increases in voltage of the accessory battery can be suppressed and prevented.

A preferred embodiment of the present invention provides a marine vessel including a hull, a propulsion device which is provided in the hull and includes an engine and a power generator attached to the engine, a main battery which is installed in the hull and is connected to the power generator and is arranged to supply power for operating the engine of the propulsion device, an accessory battery which is installed in the hull and connected to the power generator in parallel to the main battery and is arranged to supply power for devices other than the engine, and a battery charger having features described above.

The propulsion device included in the marine vessel may be in the form of an outboard motor, an inboard/outboard motor (a stern drive or an inboard motor/outboard drive), an inboard motor, a water jet drive, or other suitable motor or drive. The outboard motor includes a propulsion unit provided outboard of the vessel and having an engine (internal combustion engine or electric motor) and a propulsive force generating member (propeller), and a steering mechanism which horizontally turns the entire propulsion unit with respect to the hull. The inboard/outboard motor includes an engine provided inboard of the vessel, and a drive unit provided outboard and having a propulsive force generating member and a steering mechanism. The inboard motor includes an engine and a drive unit incorporated in the hull, and a propeller shaft extending outboard from the drive unit. In this case, a steering mechanism is separately provided. The water jet drive has a configuration such that water sucked from the bottom of the marine vessel is accelerated by a pump and ejected from an ejection nozzle provided at the stern of the marine vessel to obtain a propulsive force. In this case, the steering mechanism includes the ejection nozzle and a mechanism for turning the ejection nozzle along a horizontal plane.

Other elements, features, steps, characteristics and advantages of the present invention will become more apparent from the following detailed description of the preferred embodiments with reference to the attached drawings.

BRIEF DESCRIPTION OF THE DRAWINGS

FIG. 5A is a view for describing an example of regulation control by the main battery charge controller.

DETAILED DESCRIPTION OF THE PREFERRED EMBODIMENTS

Figure 1:
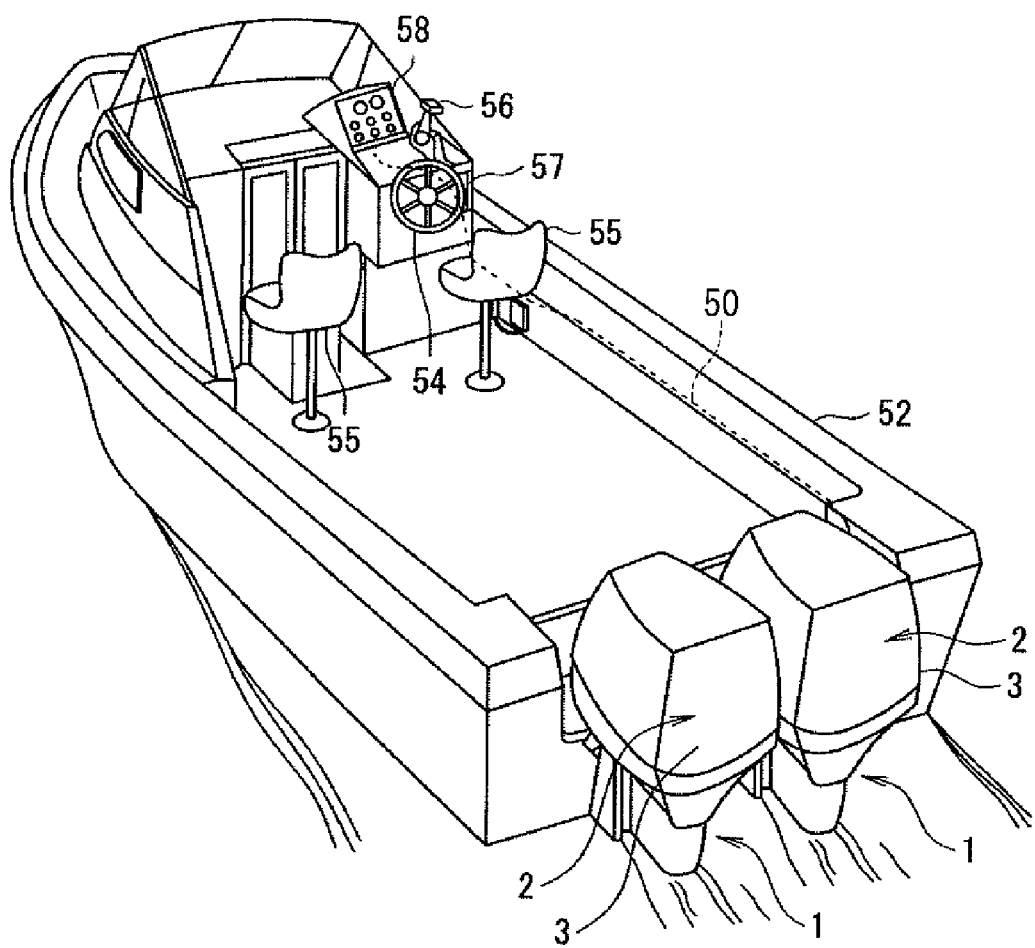
FIG. 1 is a schematic configuration view showing a marine vessel of a first preferred embodiment of the present invention.

FIG. 1 is a schematic configuration view of a marine vessel provided with a battery charge control device of a preferred embodiment of the present invention. This marine vessel preferably has two outboard motors 1 on the stern of an open-deck type hull 52, and has a control compartment on the front portion. In the control compartment, a steering wheel 54, a seat 55, a remote-control lever 56, a switch panel 57, and a meter panel 58 are arranged. The switch panel 57 has a main switch and a start switch.

Inside the outboard motor 1, an engine (not shown in FIG. 1) arranged inside the engine cover 3 and an engine control device (not shown in FIG. 1) which controls the engine are provided. Inside the switch panel 57, a remote-control device is installed for remotely controlling the outboard motor 1, and is connected to the engine control device by a cable although this is not shown.

Figure 2:
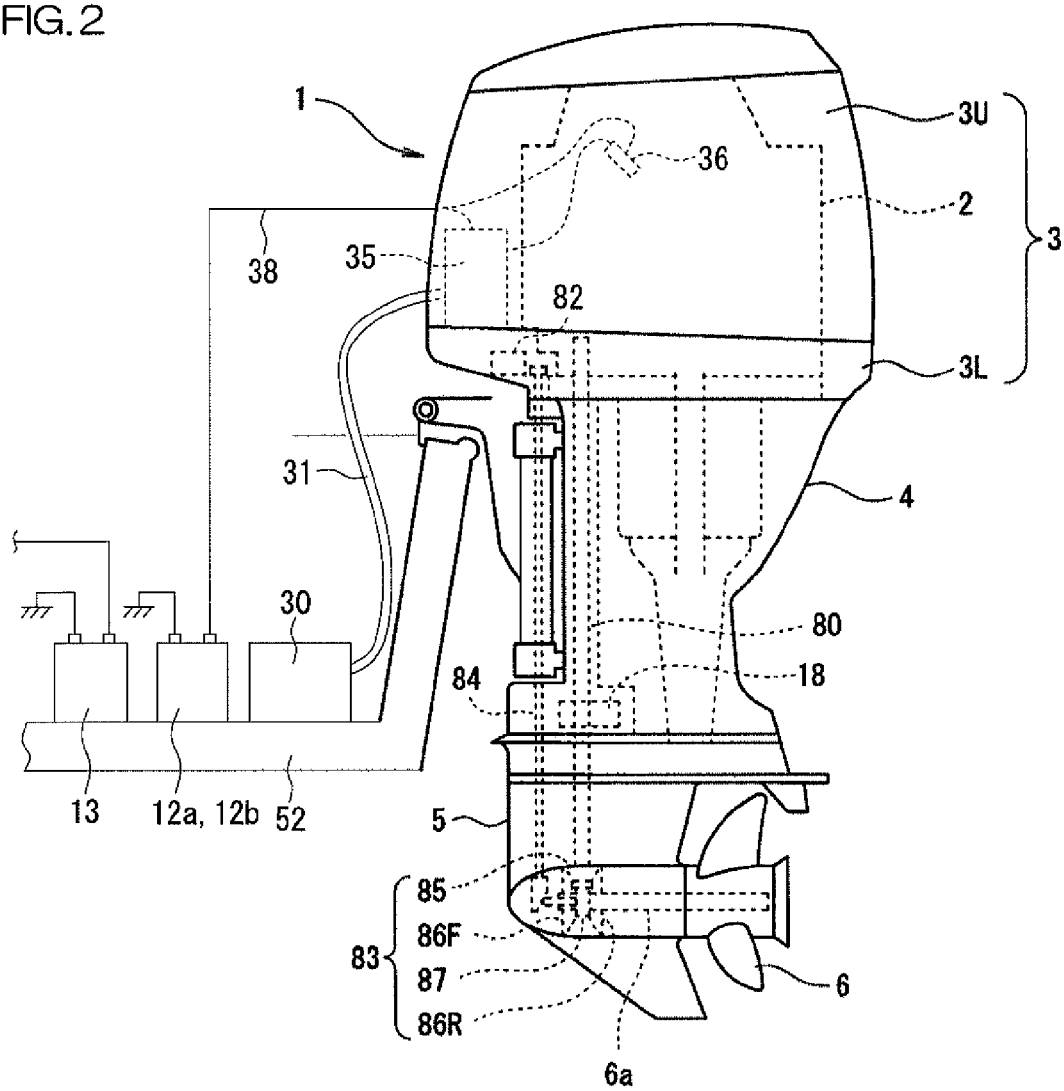
FIG. 2 is an external view of an outboard motor attached to the marine vessel of FIG. 1.

The outboard motor 1 includes, as shown in FIG. 2, an engine cover 3, an upper case 4, and a lower case 5. This outboard motor 1 is attached to the hull 52 with a clamp (not shown) so as to swing up and down and laterally. The engine cover 3 includes a combination of a top cover 3U and a lower cover 3L, and accommodates an engine 2 (internal combustion engine) inside.

In the lower case 5, a propeller shaft 6a as a rotation shaft of the propeller 6 is inserted horizontally. The lower end of the drive shaft 80 extending to the inside of the lower case 5 from the inside of the engine cover 3 is coupled to the propeller shaft 6a via a shift conversion mechanism 83.

The shift conversion mechanism 83 includes a drive gear 85, a forward drive gear 86F, and a reverse drive gear 86R which consist of bevel gears, and a dog clutch 87. The drive gear 85 is fixed to the lower end of the drive shaft 80. The forward drive gear 86F and the reverse drive gear 86R arranged rotatably on the propeller shaft 6a are engaged with the drive gear 85. On the propeller shaft 6a, a dog clutch 87 is arranged so as to slide and not to rotate with respect to the propeller shaft 6a. The dog clutch 87 is arranged between the forward drive gear 86F and the reverse drive gear 86R.

On the other hand, a shift rod 84 is arranged along the up-down direction parallel to the drive shaft 80. By rotating the shift rod 84 by a shift actuator 82, a cam surface on the lower end of the shift rod rotates, and in conjunction with this, the dog clutch 87 slides on the propeller shaft 6a. Accordingly, the dog clutch 87 is arranged at any of a neutral position, a forward drive position, and a reverse drive position.

The forward drive position is a position at which the dog clutch 87 engages with the forward drive gear 86F. Therefore, the propeller shaft 6a rotates forward and the propeller 6 generates a propulsive force in the forward drive direction. The reverse drive position is a position at which the dog clutch 87 engages with the reverse drive gear 86R. Therefore, the propeller shaft 6b rotates in reverse, and the propeller 6 generates a propulsive force in the reverse drive direction. The neutral position is an intermediate position between the forward drive position and the reverse drive position, at which the dog clutch 87 does not engage with either of the forward drive gear 86F and the reverse drive gear 86R. Therefore, the driving force from the drive shaft 80 is not transmitted to the propeller 6.

The hull 52 is equipped with two main batteries 12a and 12b to be mainly used for operating engines 2 of the two outboard motors 1. Further, the hull 52 is equipped with one accessory battery 13 to be mainly used for devices other than the engines 2.

The hull 52 is equipped with a fuel tank 30. The fuel tank 30 supplies fuel to the outboard motor 1 via a pipe 31. The outboard motor 1 includes a fuel pump 35. The fuel pump 35 pumps out fuel from the fuel tank 30 and supplies it to a fuel injection device (fuel injector) 36 attached to the engine 2.

The fuel pump 35 and the fuel injection device 36 are actuated by power supplied from the main battery 12a or 12b.

Examples of devices which are actuated by power supplied from the accessory battery 13 include various meters and gauges, a fish finder, a GPS receiver, and other electric devices. Further, in a comparatively large-scaled marine vessel, an electric range, a microwave, an electric refrigerator, an electric freezer and other electric devices may be provided in the cabin. To supply power to these devices, the accessory battery 13 is used.

To the outboard motors 1, the main batteries 12a and 12b are connected via battery switches (not shown) and battery cables 38. Power from these main batteries 12a and 12b is supplied to the electric components and the engine control devices of the outboard motors 1. The outboard motors 1 and the hull 52 side are connected by remote-control cables and throttle shift cables (both not shown). In the present preferred embodiment, the engine control device of the outboard motor 1 is preferably installed in the outboard motor 1. This engine control device and a remote-control device inside the switch panel 57 are connected by a communication cable 50 (see FIG. 1).

Figure 3:
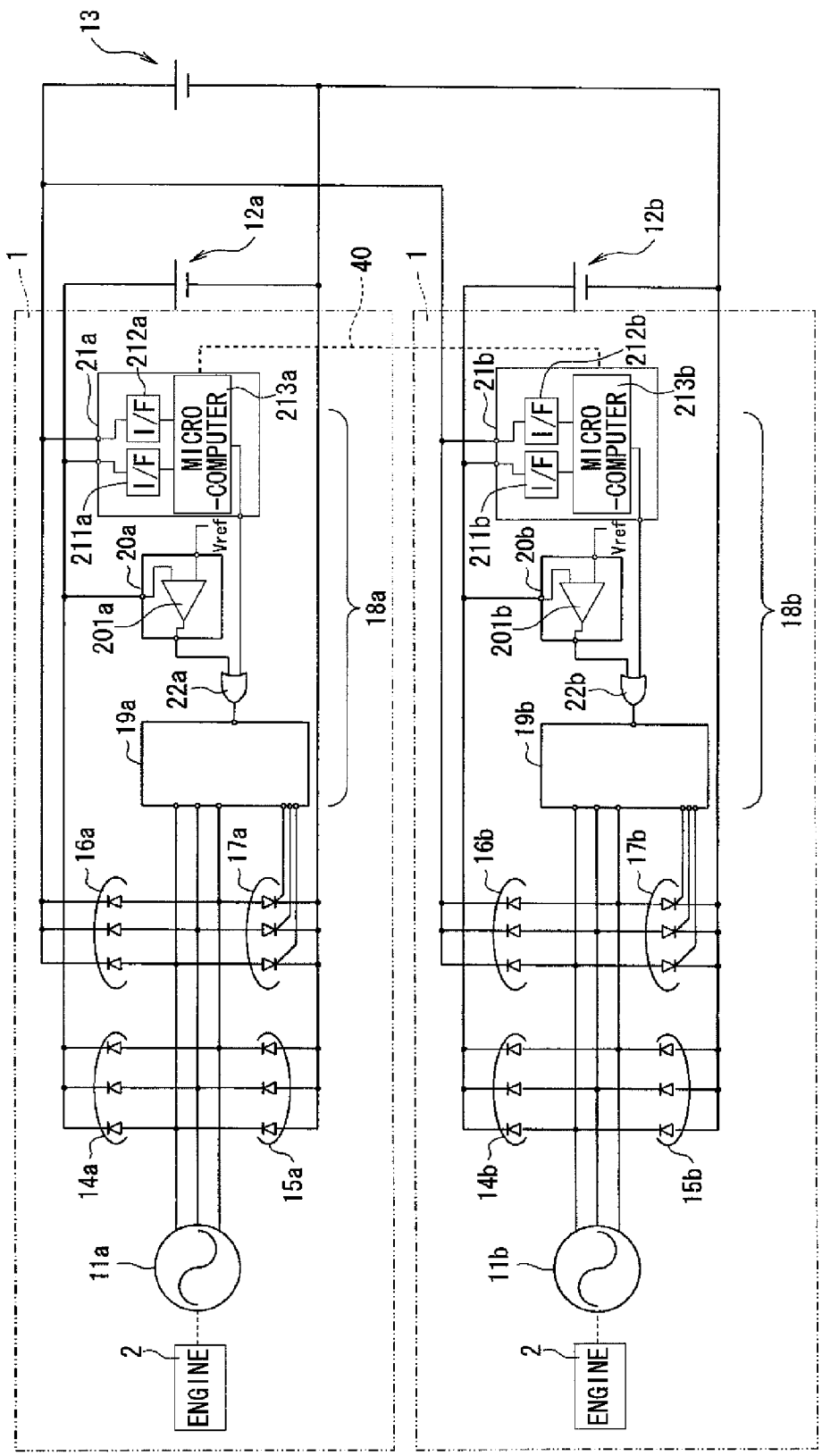
FIG. 3 is a block diagram showing a configuration of battery charge control devices installed in the marine vessel of FIG. 1.

FIG. 3 is a block diagram of battery charge control devices of a first preferred embodiment. To engines 2 of two outboard motors 1, power generators 11a and 11b are attached, respectively. These power generators 11a and 11b are driven by the engines 2 to generate power. The power generators 11a and 11b preferably are three-phase AC power generators in this preferred embodiment. Correspondingly, main batteries 12a and 12b are connected independently to the power generators 11a and 11b via positive electrode side commutators 14a and 14b and negative electrode side commutators 15a and 15b which commutate AC currents, respectively. The accessory battery 13 is commonly connected to the two power generators 11a and 11b via positive electrode side commutators 16a and 16b and the negative electrode side commutators 15a and 15b which also commutate AC currents. In other words, to the power generator 11a, the main battery 12a and the accessory battery 13 are connected in parallel. To the power generator 11b, the main battery 12b and the accessory battery 13 are connected in parallel.

The main and accessory batteries 12a, 12 and 13 are connected to the power generators 11a and 11b via thyristors 17a and 17b. The thyristors 17a and 17b are switching elements for short-circuiting the power generators 11a and 11b. The thyristors 17a are interposed between the power generator 11a and the negative electrode sides of the main and accessory batteries 12 and 13. When the thyristors 17a are turned ON, power generated by the power generator 11a returns to the power generator 11a from the thyristors 17a through the negative electrode side commutators 15a, and flows again to the thyristor 17a side. Therefore, the power does not flow to the side of the main battery 12a and the accessory battery 13, so that charging of the main battery 12a and the accessory battery 13 is suppressed, that is, regulated. Similarly, the thyristors 17b are interposed between the power generator 11b and the negative electrode sides of the main and accessory batteries 12b and 13. When the thyristors 17b are turned ON, power generated by the power generator 11b returns to the power generator 11b from the thyristors 17b through the negative electrode side commutators 15b. Therefore, the power does not flow to the side of the main battery 12b and the accessory battery 13, so that charging of the main battery 12b and the accessory battery 13 is suppressed, that is, regulated.

Charging of the main batteries 12a and 12b and the accessory battery 3 by the power generators 11a and 11b is controlled by two charge control devices 18a and 18b provided corresponding to the power generators 11a and 11b. The charge control devices 18a and 18b include timing adjusters 19a and 19b, main battery charge controllers 20a and 20b, accessory battery charge controllers 21a and 21b, and OR gates 22a and 22b, respectively.

The timing adjusters 19a and 19b suppress charging of the main batteries 12a and 12b and the accessory battery 13 by controlling to turn ON/OFF the thyristors 17a and 17b. This control is referred to as "regulation control".

The main battery charge controllers 20a and 20b output charge stop signals as needed to control the charged states of the main batteries 12a and 12b, respectively. The accessory battery charge controllers 21a and 21b output charge stop signals as needed to control a charged state of the accessory battery 13.

When at least one of the main battery charge controller 20a and the accessory battery charge controller 21a outputs a charge stop signal, the OR gate 22a inputs the charge stop signal into the timing adjuster 19a. Similarly, when at least one of the main battery charge controller 20b and the accessory battery charge controller 21b outputs a charge stop signal, the OR gate 22a inputs the charge stop signal into the timing adjuster 19a.

When charge stop signals are input from the OR gates 22a and 22b, the timing adjusters 19a and 19b perform regulation control in response to the charge stop signals. In detail, the timing adjusters 19a and 19b detect three-phase AC currents from the power generators 11a and 11b, and turn the thyristors 17a and 17b ON at timings at which the current values become zero. During input of the charge stop signals, the timing adjusters 19a and 19b hold the ON states of the thyristors 17a and 17b. The OR gates 22a and 22b and the timing adjusters 19a and 19b define element control units which control the thyristors 17a and 17b.

The main battery charge controllers 20a and 20b, the OR gates 22a and 22b, and the timing adjusters 19a and 19b define first control units which control the thyristors 17a and 17b. The accessory battery charge controllers 21a and 21b, the OR gates 22a and 22b, and the timing adjusters 19a and 19b define second control units which control the thyristors 17a and 17b.

The main battery charge controllers 20a and 20b preferably include, for example, analog circuits. In this preferred embodiment, the main battery charge controllers 20a and 20b include comparators 201a and 201b, respectively. The voltage of the main battery 12a (main battery voltage) is input into one terminal of the comparator 201a, and a reference voltage Vref is input into the other terminal of the computer 201a. Similarly, the voltage of the main battery 12b (main battery voltage) is input into one terminal of the comparator 201b, and the reference voltage Vref is input into the other terminal of the computer 201b. Preferably, the reference voltage Vref is set equal to an upper limit (first upper limit) MUL (for example, MUL=14V) of a predetermined main battery allowable voltage range.

The main battery charge controllers 20a and 20b determine whether they charge or regulate the corresponding main batteries 12a and 12b by detecting voltages of the main batteries 12a and 12b in a comparatively short main battery control period set to approximately several milliseconds. Then, the main battery charge controllers 20a and 20b output regulation control commands corresponding to the determinations to the timing adjusters 19a and 19b. The regulation control command includes a charge permission signal or a charge stop signal. In other words, the comparators 201a and 201b compare the main battery voltages with the reference voltage Vref, and when the main battery voltages exceed the reference voltage Vref, the comparators output charge stop signals, and when the main battery voltages are not more than the reference voltage Vref, the comparators output charge permission signals. For example, the charge stop signal is a high level signal, and a charge permission signal is a low level signal.

The accessory battery charge controller 21a includes interfaces 211a and 212a and a microcomputer 213a connected to these interfaces 211a and 212a. The interface 211a takes a voltage value of the main battery 12a (main battery voltage) in each sampling period (for example, 10 milliseconds) and inputs it into the microcomputer 213a. The interface 212a takes a voltage value of the accessory battery 13 (accessory battery voltage) in each sampling period (for example, 10 milliseconds) and inputs it into the microcomputer 213a.

Similarly, the accessory battery charge controller 21b includes interfaces 211b and 212b and a microcomputer 213b connected to these interfaces 211b and 212b. The interface 211b takes a voltage value of the main battery 12b (main battery voltage) in each predetermined sampling period (for example, 10 milliseconds) and inputs it into the microcomputer 213b. The interface 212b takes a voltage value of the accessory battery 13 (accessory battery voltage) in each sampling period (for example, 10 milliseconds) and inputs it into the microcomputer 213b.

The accessory battery charge controllers 21a and 21b output regulation control commands in a comparatively long accessory battery control period set to several seconds (for example, 1 to 2 seconds) In detail, the accessory battery charge controllers 21a and 21b determine whether they charge or regulate the accessory battery 13 based on the voltages of the main batteries 12a and 12b and the accessory battery 13. Then, the accessory battery charge controllers 21a and 21b output regulation control commands corresponding to the determinations to the timing adjusters 19a and 19b. The regulation control command includes a charge permission signal or a charge stop signal. For example, the charge stop signal is a high level signal, and the charge permission signal is a low level signal.

The accessory battery charge controllers 21a and 21b make a charge/regulation determination by using the voltages of an averaged accessory battery 13. Further, the accessory battery charge controllers 21a and 21b forcibly shift to main battery charge control without waiting for the accessory battery control period when the voltages of the main batteries 12a and 12b become not more than the lower limit MLL (<MUL, for example, MLL=13.5V) of the main battery allowable voltage range.

By the operation of the OR gate 22a, when at least one of the charge controllers 20a and 21a outputs a charge stop signal, the timing adjuster 19a turns the thyristors 17a ON and performs regulation control. Similarly, by the operation of the OR gate 22b, when at least one of the charge controllers 20b and 21b outputs a charge stop signal, the timing adjuster 19b turns the thyristors 17b ON and performs regulation control.

In these charge control devices, when the accessory battery 13 is charged, the main batteries 12a and 12b corresponding to the charge control devices 18a and 18b which supply the charging power to the accessory battery are also charged simultaneously. In other words, when either of the main batteries 12a and 12b is charged, the accessory battery 13 is also charged simultaneously.

The timing adjusters 19a and 19b and the main battery charge controllers 20a and 20b may include analog circuits such as ICs installed in existing charge control devices (for example, rectifier regulators). The functions of the accessory battery charge controllers 21a and 21b are preferably realized by programs of the microcomputers 213a and 213b (examples of computer systems).

Figure 4A:
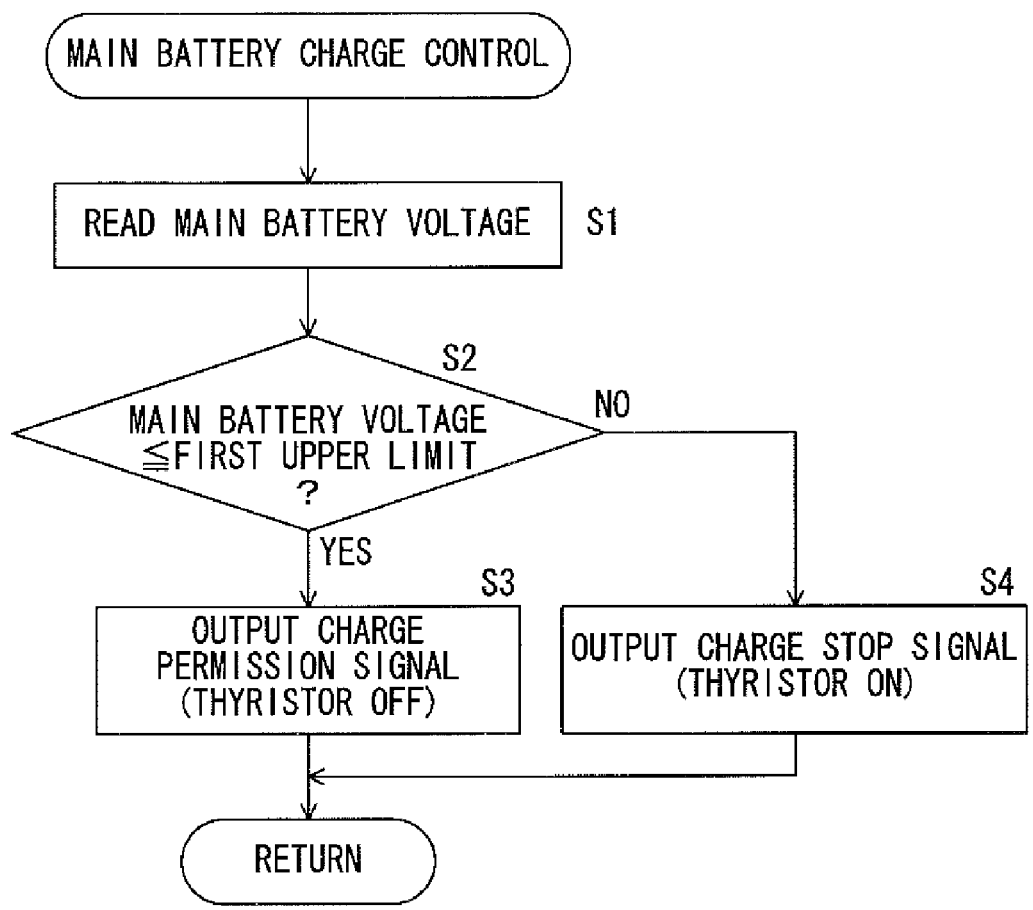
FIG. 4A is a flowchart showing processing to be performed in the main battery charge controller of FIG. 3, and FIG. 4B and FIG. 4C are flowcharts showing processing to be performed in the accessory battery charge controller of FIG. 3.

FIG. 4A is a flowchart showing the function of the main battery charge controllers 20a and 20b. The main battery charge controllers 20a and 20b preferably include analog circuits, so that the control shown in FIG. 4A is executed by hardware such as an IC, for example. This control is repeatedly executed in the main battery control period of approximately several milliseconds, for example.

First, the main battery charge controllers 20a and 20b read the main battery voltages (voltages of the corresponding main batteries 12a and 12b) as shown in Step S1. Next, the main battery charge controllers 20a and 20b (comparators 201a and 201b) determine whether the main battery voltages are within the main battery allowable voltage range as shown in Step S2. In detail, the main battery charge controllers 20a and 20b determine whether the voltages of the corresponding main batteries 12a and 12b equal to or less than the upper limit (first limit) MUL (=Vref, e.g., 14V) of the main battery allowable voltage. When the main battery voltages are equal to or less than the upper limit MUL, the main battery charge controllers 20a and 20b output charge permission signals (thyristor OFF commands) as shown in Step S3. On the other hand, when the main battery voltages are more than the upper limit MUL, the main battery charge controllers 20a and 20b output charge stop signals (thyristor ON commands) as shown in Step S4.

Figure 4C:
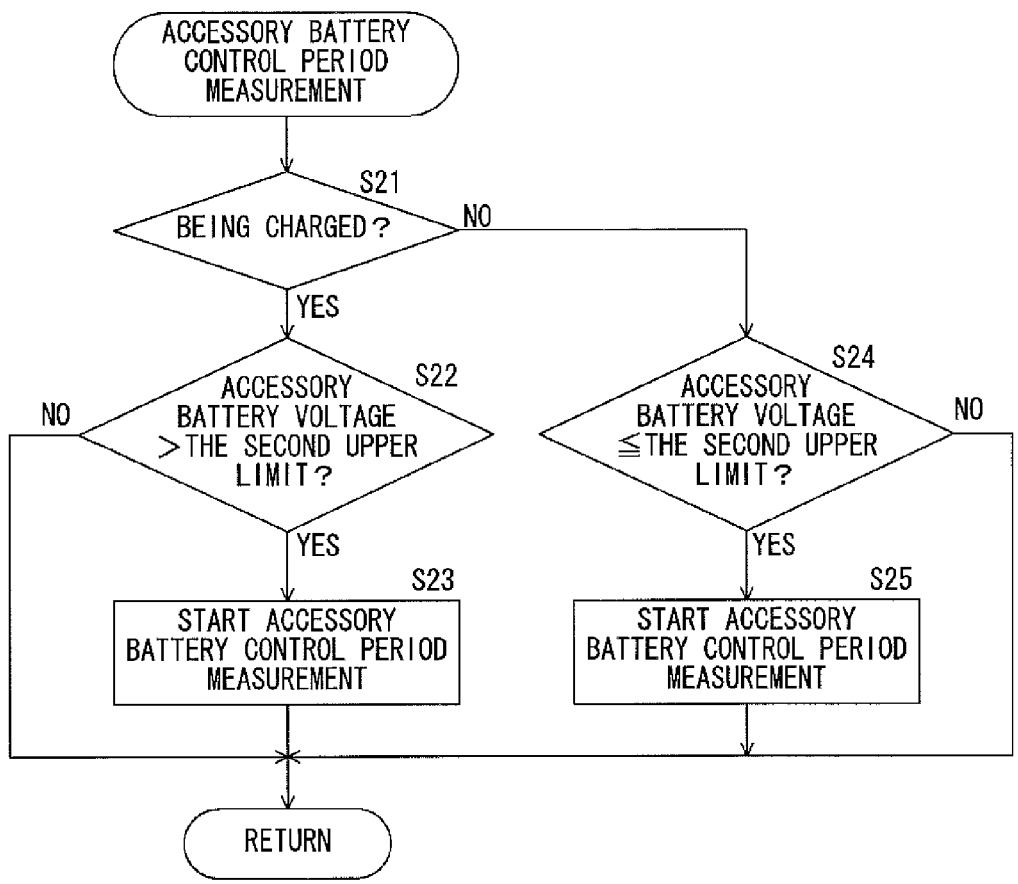

FIG. 4B and FIG. 4C are flowcharts showing a program of arithmetic processing to be performed in the accessory battery charge controllers 21a and 21b. FIG. 4B shows processing for permitting/stopping charging, and FIG. 4C shows measurement processing of an accessory battery control period. The arithmetic processing is executed repeatedly in every predetermined charge control period (for example, 10 milliseconds). The charge control period may be as long as the sampling period, for example.

The microcomputers 213a and 213b read main battery voltages and an accessory battery voltage first (Step S11). Further, the microcomputers 213a and 213b obtain an average of the voltage of the accessory battery 13 (Step S12). This average may be a moving average of accessory battery voltage values read in the charge control periods, or may be an average in a predetermined period. In addition, the average may be a value obtained by applying averaging filter processing (for example, low-pass filtering) to the accessory battery voltage.

Next, the microcomputers 213a and 213b determine whether the main battery voltages are less than the lower limit MLL (<MUL) of the main battery allowable voltage range (Step S13). When the main battery voltages are less than the lower limit MLL (Step S13: YES), the microcomputers 213a and 213b output charge permission signals (thyristor OFF commands) (Step S17).

When the main battery voltage is not less than the lower limit MUL (Step S13: NO), next, the microcomputers 213a and 213b determine whether the average of the voltage of the accessory battery 13 is within an accessory battery allowable voltage range (Step S14). In detail, the microcomputers 213a and 213b determine whether the average value of the voltage of the accessory battery 13 is equal to or less than an upper limit AUL (second upper limit, for example, AUL=15V) of the accessory battery allowable voltage range. When the average of the voltage of the accessory battery 13 is equal to or less than the second upper limit AUL (Step S14: YES), the microcomputers 213a and 213b determine whether the accessory battery control period has elapsed (Step S15). When it is before the accessory battery control period elapses (Step S15: NO), the microcomputers 213a and 213b maintain the regulation control commands (charge permission signal or charge stop signals) in the previous state (Step S16), and return to the main program. When the accessory battery control period has elapsed (Step S15: YES), the microcomputers 213a and 213b output charge permission signals (thyristor OFF commands) (Step S17).

On the other hand, when the accessory battery voltage exceeds the second upper limit AUL (Step S14: NO), the microcomputers 213a and 213b determine whether the accessory battery control period has elapsed (Step S18). When it is before the accessory battery control period elapses (Step S18: NO), the microcomputers 213a and 213b maintain the regulation control commands (charge permission signals or charge stop signals) in the previous state (Step S16), and return to the main program. When the accessory battery control period has elapsed (Step S18: YES), the microcomputers 213a and 213b output charge stop signals (thyristor ON commands) (Step S19).

The accessory battery control period is measured according to the process of FIG. 4C. The microcomputers 213a and 213b determine whether charging is being performed, that is, whether the regulation control commands output by the microcomputers 213a and 213b are charge permission signals (Step S21).

When charging is being performed (Step S21: YES), the microcomputers 213a and 213b determine whether the average of the accessory battery voltage (arithmetic value at Step S12 of FIG. 4B) exceeds the second upper limit AUL (Step S22). When charging is being performed and the average of the accessory battery voltage exceeds the second upper limit AUL, the microcomputers 213a and 213b reset timers installed inside and start measurement of the accessory battery control period (Step S23).

On the other hand, when charging is not being performed, that is, when the regulation control commands are charge stop signals (Step S21: NO), the microcomputers 213a and 213b determine whether the average of the accessory battery voltage (arithmetic value at Step S12 of FIG. 4B) is equal to or less than the second upper limit AUL (Step S24). When charging is being stopped and the average of the accessory battery voltage is equal to or less than the second upper limit AUL, the microcomputers 213a and 213b reset timers installed inside and start measurement of the accessory battery control period (Step S25).

The accessory battery control periods measured at Step S23 and Step S25 may be equal to each other, or one accessory battery control period may be longer than the other accessory battery control period. In either case, the accessory battery control period is much longer than the charge control period based on the main battery voltage, and is set to, for example, 100 times or more of the charge control period.

Thus, while the microcomputers 213a and 213b perform control based on the main battery voltages in the charge control period (for example, 10 milliseconds), the microcomputers 213a and 213b perform control based on the accessory battery voltage in accessory battery control period (for example, one to two seconds). When the main battery voltages are less than the lower limit MLL (Step S13), the control (Steps S14, S15, S16, S18, S19) based on the accessory battery voltage is invalidated. In other words, the processing of Step S13 by the microcomputers 213a and 213b corresponds to a function as an invalidating unit.

The upper limit AUL (for example, 15V) of the accessory battery allowable voltage range is set to be higher than the upper limit MUL (for example, 14V) of the main battery allowable voltage range.

At Step S17, the microcomputers 213a and 213b output charge permission signals (thyristor OFF commands) to the timing controllers 19a and 19b such that charge control is performed, and then return to the main program.

At Step S19, the microcomputers 213a and 213b output charge stop signals (thyristor ON commands) to the timing controllers 19a and 19a such that regulation control is performed, and then return to the main program.

The power of the main batteries 12a and 12b is used for operating the engines 2 of the outboard motors 1. In detail, the power of the main batteries 12a and 12b is supplied to starter motors, ignition plugs, fuel injection devices 36, fuel pumps 35, shift actuators 82, and other electric components for operating the engines 2. Therefore, when the outboard motors 1 are operated and the marine vessel is made to run, the power of the main batteries 12a and 12b is consumed. When voltages of the main batteries 12a and 12b are excessively low, such low voltages may obstruct driving of the electric components, so that it is important that the main battery voltages are reliably maintained within the allowable range. Particularly, unless the fuel pump 35 and the fuel injection device 36 are driven with proper voltages (for example, 14V), necessary discharge pressures cannot be obtained.

On the other hand, the power of the accessory battery 13 is used for purposes other than operation of the engines 2. In detail, for example, the power from the accessory battery 13 is supplied to various meters and gauges, a fish finder, a GPS receiver, an electric range, a microwave, an electric refrigerator, and other devices. These devices are arbitrarily used by users, and are not devices essential for running of the marine vessel. Therefore, power consumption of these greatly depends on how the devices are used by the users. Therefore, there is a possibility that the power of the accessory battery 13 is hardly consumed, and a decrease in voltage of the accessory battery 13 is exclusively caused by natural discharge. In this case, the voltage of the accessory battery 13 is comparatively high, so that charging is regulated. However, it is not proper to regulate charging when voltages of the main batteries 12a and 12b are low.

In the battery charge control devices shown in FIG. 3, normally, target charging voltages of the main batteries 12a and 12b and the accessory battery 13 preferably are not different. However, depending on a manufacturing tolerance of the components and a use environment, for example, a battery voltage reading error may occur. For example, it is assumed that one charge control device 18a reads a battery voltage lower than the actual voltage, and the other charge control device 18 properly reads a battery voltage. In this case, for example, the charge control device 18a operates to control the main battery voltage to be comparatively high (for example, 15V), and on the other hand, the charge control device 18b operates to control the main battery voltage to be comparatively low (for example, 14V). In this case, when the accessory battery control period and the main battery control period are equal to each other, the voltage of the main battery 12b of the charge control device 18b side may excessively decrease.

In detail, the charge control device 18b which properly reads the battery voltage stops charging more easily than the charge control device 18a which reads the battery voltage lower than the actual voltage. In this case, the accessory battery 13 is charged mainly by the charge control device 18a which reads the battery voltage lower than the actual voltage.

When the charge control period of the accessory battery 13 is equal (for example, several milliseconds) to that of the main batteries 12a and 12b, depending on the use situation of the accessory battery 13, the voltage of the accessory battery hardly decreases. Therefore, the charge control device 18b which properly reads the battery voltage continuously regulates charging. As a result, the corresponding main battery 12b is not charged, and the voltage thereof decreases.

Therefore, in this preferred embodiment, while charge control (first control) by the main battery charge controllers 20a and 20b is performed in a short control period (several milliseconds), charge control (second control) by the accessory battery charge controllers 21a and 21b is performed in a long control period (several seconds). Accordingly, even when the accessory battery charge controllers 21a and 21b output charge stop signals, if the voltage of the accessory battery 13 decreases during the subsequent several seconds, in the next accessory battery control period, the accessory battery charge controllers 21a and 21b output charge permission signals. Accordingly, regulation is released and the main batteries 12a and 12b and the accessory battery 13 are charged.

In the present preferred embodiment, the upper limit (second upper limit) AUL of the accessory battery allowable voltage range is set to be higher than the upper limit (first upper limit) MUL of the main battery allowable voltage range. Accordingly, the voltage of the accessory battery 13 more easily becomes not more than the upper limit (second upper limit) AUL of the accessory battery allowable voltage range. Accordingly, the chance to charge the main batteries 12a and 12b can be increased, and excessive decreases in voltage of the main batteries 12a and 12b can be suppressed.

Further, according to this preferred embodiment, even if the accessory battery voltage exceeds the second upper limit AUL, when the main battery voltages are less than the lower limit MLL, regulation is not performed. In other words, when the main battery voltages are less than the lower limit MLL, the regulation control based on the accessory battery voltage is invalidated. Then, without waiting for the accessory battery control period, the main batteries 12a and 12b and the accessory battery 13 are charged (Steps S13 and S17). Accordingly, the voltages of the main batteries 12a and 12b can be more reliably prevented from excessively decreasing.

A slight change in voltage of the accessory battery 13 has no great influence. The reason for this is that devices connected to the accessory battery do not require supply of strictly controlled voltages. In addition, the voltage change of the accessory battery 13 does not influence the operation of the engines 2.

FIG. 5A is a view showing regulation control by the main battery charge controllers 20a and 20b, showing an example of time changes of the main battery voltage and the accessory battery voltage. Under a situation in which devices connected to the accessory battery 13 sufficiently consume power, the voltage increase in the accessory battery 13 is suppressed. In this case, by control in several-millisecond periods, for example, by the main battery charge controllers 12a and 12b preferably including analog circuits, charging of the main batteries 12a and 12b and the accessory battery 13 is controlled. Therefore, charging and regulation of charging are switched in short periods, and the voltages of the main batteries 12a and 12b and the accessory battery 13 are kept at approximately 14V (the first upper limit MUL), for example.

Figure 5B:
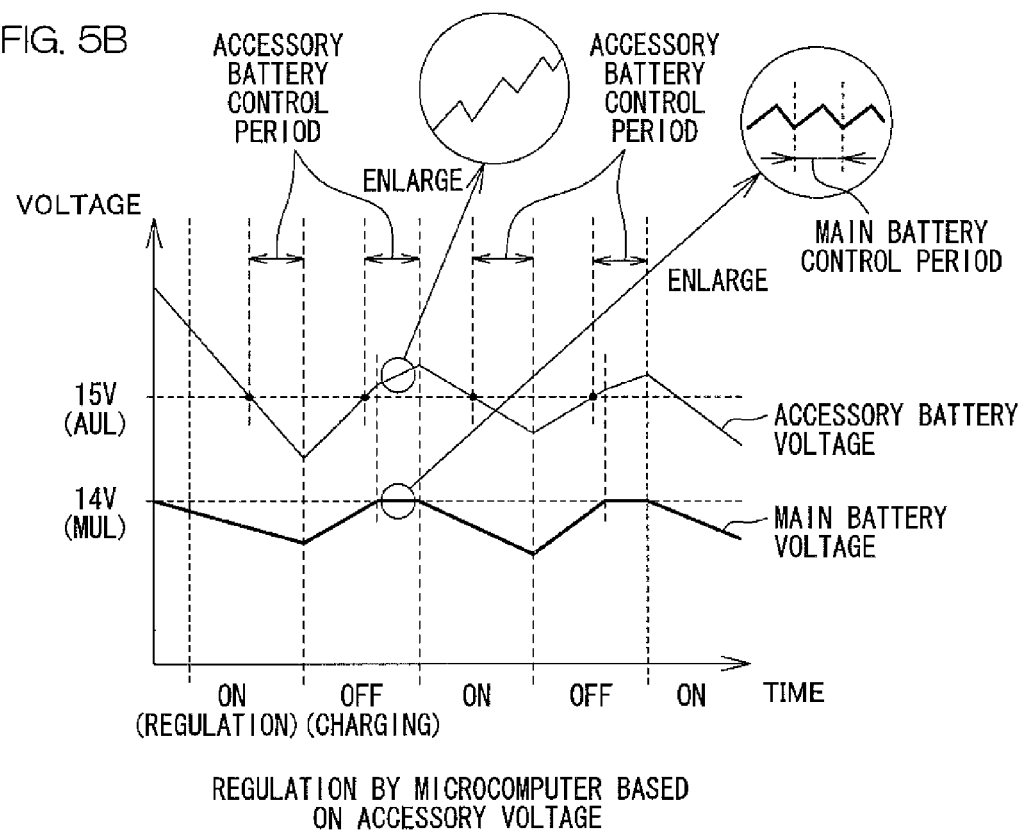
FIG. 5B and FIG. 5C are views for describing an example of regulation control by the accessory battery charge controller.

FIG. 5B is a view showing regulation control by the accessory battery charge controllers 21a and 21b, showing an example of time changes of the main battery voltage and the accessory battery voltage. Under a situation in which devices connected to the accessory battery 13 do not sufficiently consume power, the voltage of the accessory battery 13 reaches the second upper limit AUL. In this case, by control in the accessory battery control period (several seconds) by the accessory battery charge controllers 21a and 21b including the microcomputers 213a and 213b, charging of the main batteries 12a and 12b and the accessory battery 13 is controlled.

The accessory battery control period is sufficiently long, so that when regulation is performed by the accessory battery charge controllers 21a and 21b, the voltage of the accessory battery 13 decreases during the regulation. When the voltage of the accessory battery 13 becomes less than the second upper limit AUL, charging is permitted after the elapse of the accessory battery control period, so that the voltages of the accessory battery 13 and the main batteries 12a and 12b increase. When the main battery voltage reaches the first upper limit MUL, regulation control by the main battery charge controllers 20a and 20b intervenes, and charging and regulation are repeated in control periods of several milliseconds, for example.

When the accessory battery voltage exceeds the second upper limit AUL while the accessory battery charge controllers 21a and 21b output charge permission signals, the accessory battery charge controllers 21a and 21b output charge stop signals after the accessory battery control period elapses.

Figure 5C:
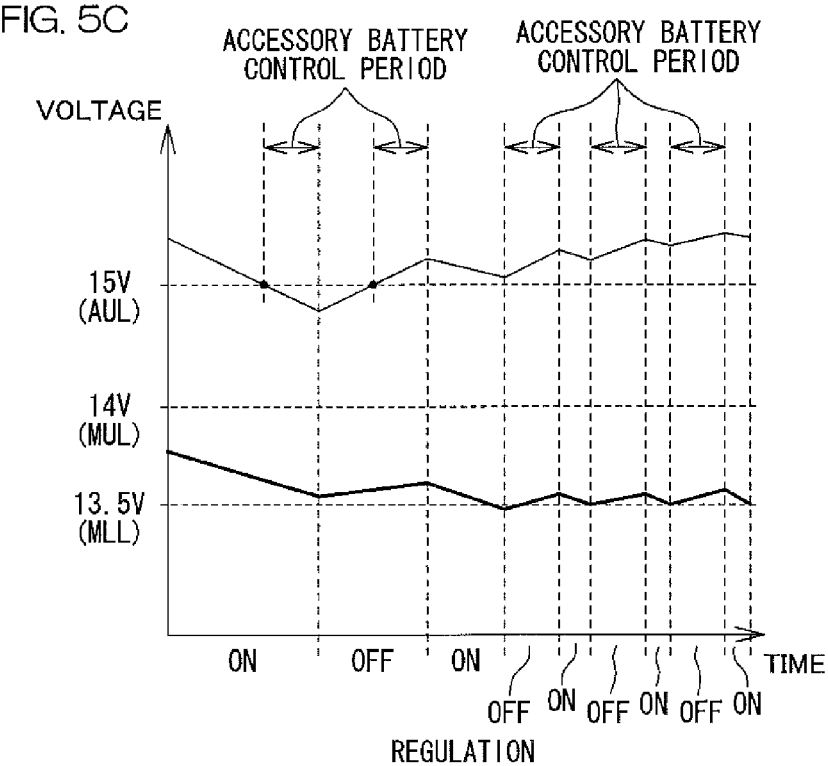

FIG. 5C is a view showing regulation control by the accessory battery charge controllers 21a and 21b, showing another example of time changes of the main battery voltage and the accessory battery voltage. The accessory battery 13 is charged by the plurality of charge control devices 18a and 18b. For example, it is assumed that while one charge control device 18a reads a voltage lower than the actual voltage, the other charge control device 18b properly reads a voltage. In this case, as described above, the charge control device 18b regulates charging more easily than the charge control device 18a. As a result, the main battery 12b corresponding to the charge control device 18b is hardly charged. Even in this situation, the accessory battery control period is long, and, therefore, the chance to charge the main battery 12b is secured to some degree. Nevertheless, the voltage of the main battery 12b may gradually decrease and become lower than the lower limit MLL.

In this case, in the present preferred embodiment, regulation control based on the accessory battery voltage is invalidated, and the accessory battery charge controller 21b generates a charge permission signal. Accordingly, the main battery 12b is charged. When the main battery voltage becomes not less than the lower limit MLL according to this charging, if the accessory battery voltage exceeds the second upper limit AUL, the accessory battery charge controller 21b generates a charge stop signal after the accessory battery control period elapses. Thus, charging (thyristor OFF) and regulation of charging (thyristor ON) are repeated. During such control, the voltage of the accessory battery 13 may increase over the upper limit AUL; however, this does not become a big problem. Rather, the outboard motor 1 can be reliably operated by putting priority on securing of the voltage of the main battery 12b. Further, the accessory battery 13 can also be prevented from excessively increasing in voltage by regulation control in the accessory battery control periods.

On the other hand, in this preferred embodiment, regulation control is performed preferably by using an average value of the accessory battery voltage. Accordingly, driving of thyristors (regulation control) according to a change in accessory battery voltage in a short time can be suppressed or prevented. As a result, the voltages of the main batteries can be prevented from excessively decreasing.

As shown by the dashed line in FIG. 3, the accessory battery charge controllers 21a and 21b may make data communications with each other via a communication line 40. Accordingly, the accessory battery control periods can be synchronized. Unless the accessory battery control periods of the plurality of accessory battery charge controllers 21a and 21b are synchronized, even when either of the charge control devices regulates charging, the other charge control device may charge the accessory battery 13. This may cause the voltage of the accessory battery 13 to excessively increase. Therefore, by synchronizing the accessory battery control periods in the plurality of accessory battery charge controllers 21a and 21b, an excessive increase in the accessory battery voltage can be prevented.

Figure 8:
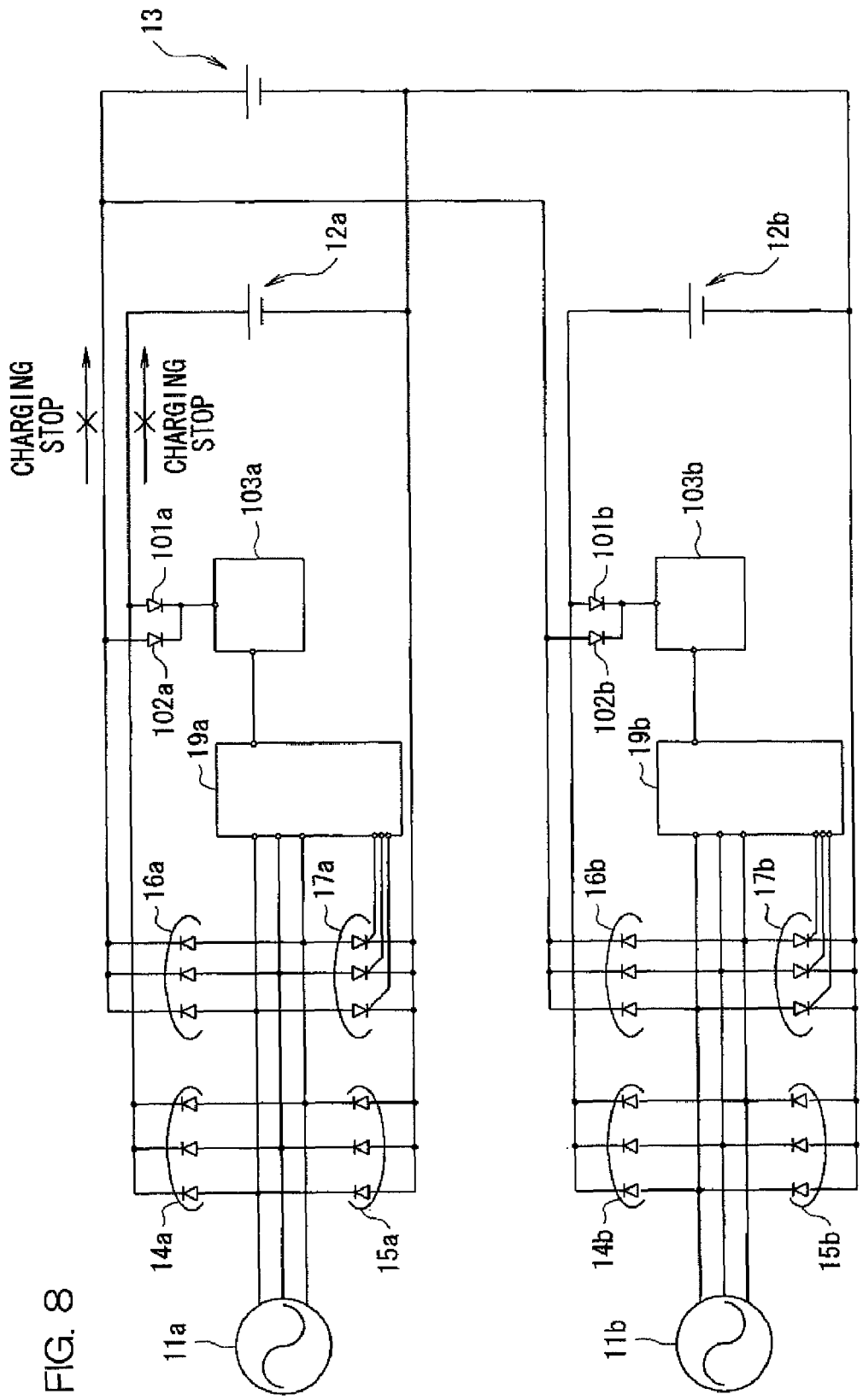
FIG. 8 is a block diagram showing battery charge control devices of a comparative example.

FIG. 8 shows battery charge control devices of a comparative example prepared for comparison to a preferred embodiment of the present invention. For easy understanding, the same components as those in the battery charge control devices of the preferred embodiment described above will be designated with the same reference numerals, and detailed description thereof will be omitted. Battery controllers 103a and 103b of the battery charge control devices of this comparative example respectively detect, voltages of the main batteries 12a and 12b via commutators 101a and 101b and voltage of the accessory battery 13 via commutators 102a and 102b. The battery controllers 103a and 103b perform charging and regulation control in short control periods of approximately several milliseconds such that the detected voltages fall within the allowable voltage range.

Figure 9:
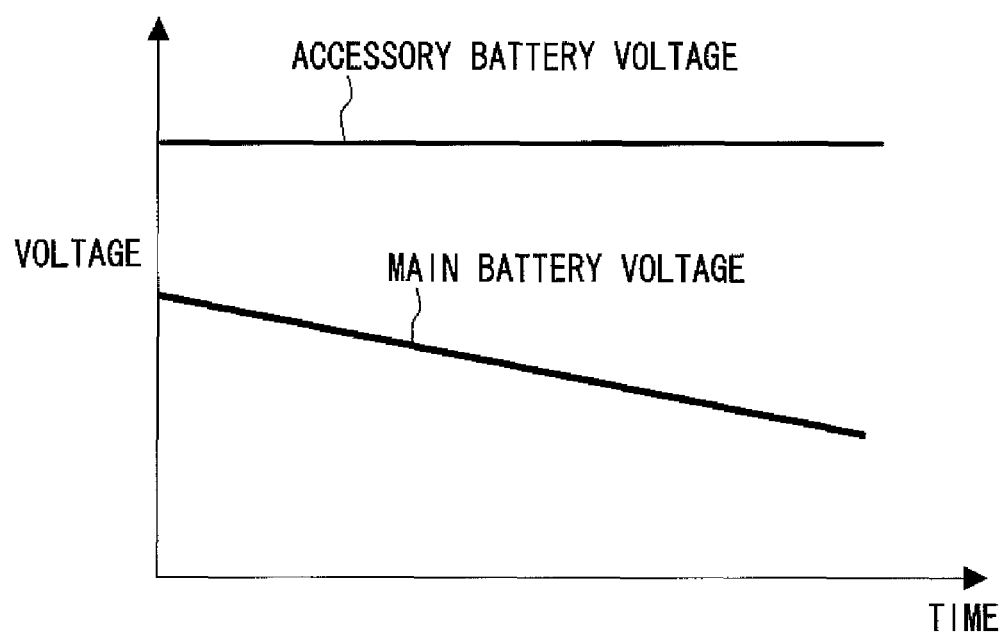
FIG. 9 is a view for describing a main battery voltage decrease occurring when the accessory battery voltage is high.

For example, it is assumed that one battery controller 103a reads a voltage lower than the actual voltage, and on the other hand, the other battery controller 103b properly reads a voltage. In this case, the battery charge control device 103a which reads a main battery voltage lower than the actual voltage more easily charges the accessory battery 13 than the other battery charge control device 103b. Further, the battery charge control device 103a reads a battery voltage lower than the actual voltage, so that the voltage of the accessory battery 13 is controlled to be higher than a proper value. As a result, the battery charge control device 103b, which properly reads battery voltages, reads the accessory battery voltage controlled to be higher than a proper value, and continues regulation of charging. Accordingly, the voltage of the corresponding main battery 12b decreases as shown in FIG. 9.

The present preferred embodiment can solve this problem as described above.

Figure 6:
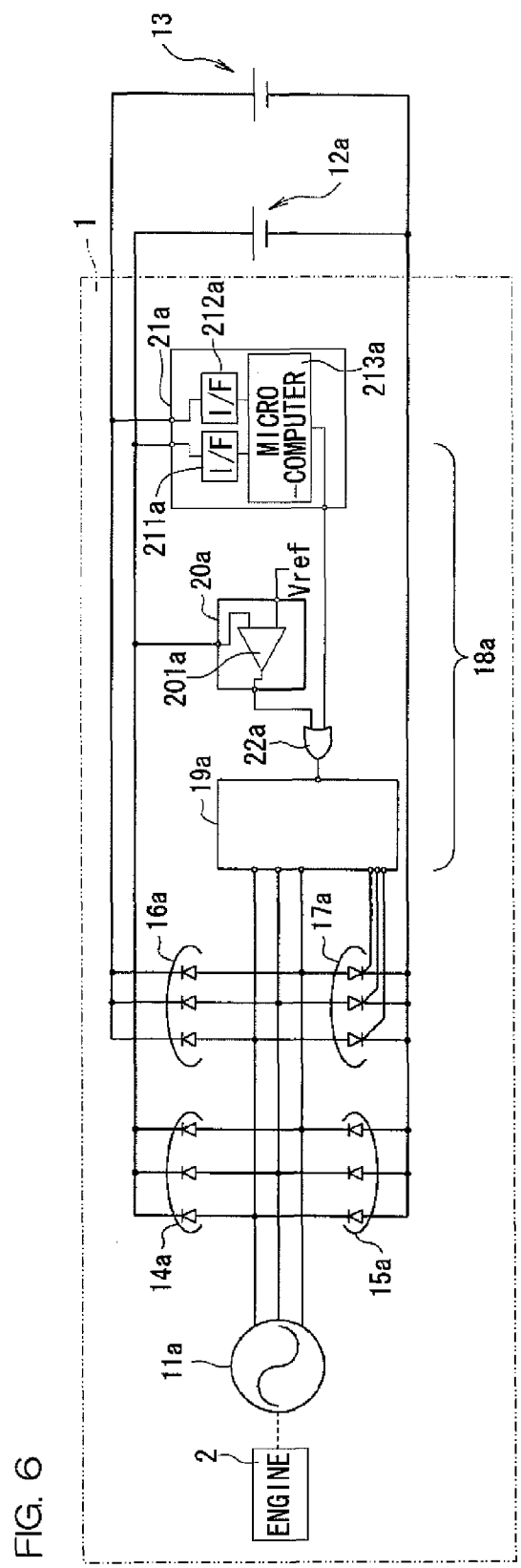
FIG. 6 is a block diagram showing a configuration of a battery charge control device for a marine vessel of a second preferred embodiment of the present invention.

FIG. 6 is a block diagram showing a configuration of a charge control device for a marine vessel of a second preferred embodiment of the present invention. In FIG. 6, portions equivalent to the portions shown in FIG. 3 described above will be designated with the same reference numerals.

The configuration of the marine vessel is preferably equivalent to that shown in FIG. 1. However, in the present preferred embodiment, only one outboard motor 1 having the configuration shown in FIG. 2 is provided. Accordingly, only one power generator 11a is provided, only one main battery 12a is provided, and only one charge control device 18a is provided, for example. Even in this configuration, the control described in FIG. 4A is performed in the main battery controller 20a, and the control described in FIG. 4B and FIG. 4C is performed in the accessory battery controller 21a. Accordingly, it becomes possible to properly control the voltages of the main battery 12a and the accessory battery 13.

Figure 7:
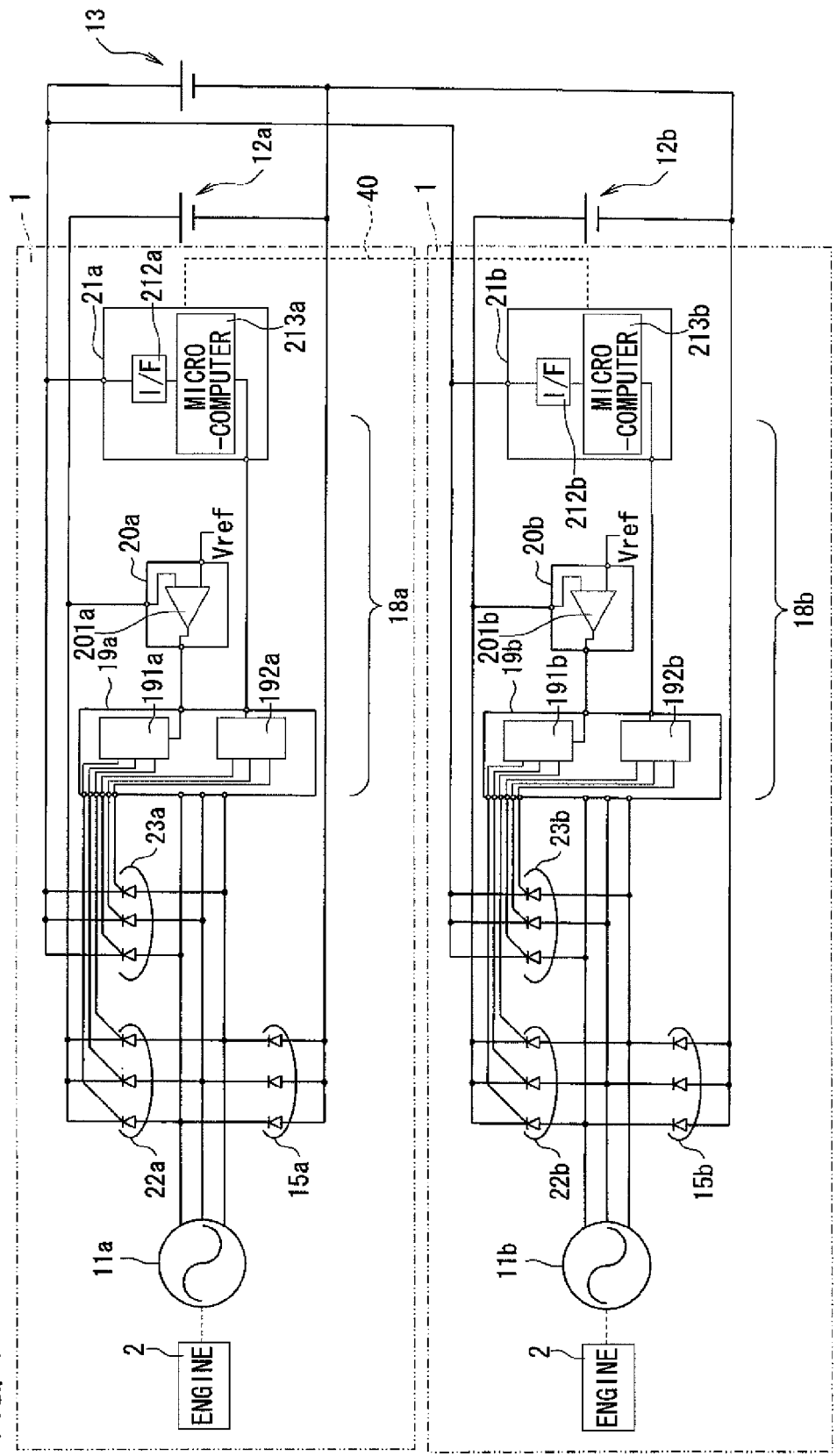
FIG. 7 is a block diagram showing a configuration of battery charge control devices for a marine vessel of a third preferred embodiment of the present invention.

FIG. 7 is a block diagram showing a configuration of battery charge control devices for a marine vessel of a third preferred embodiment of the present invention. The configuration of the marine vessel is preferably equivalent to the configuration shown in FIG. 1. Two outboard motors 1 installed in this marine vessel also have the same configuration as shown in FIG. 2.

In the present preferred embodiment, charge control devices for the main batteries 12a and 12b and the accessory battery 13 installed in the hull are changed from those shown in FIG. 3 of the first preferred embodiment to those shown in FIG. 7. The changed charge control devices also include components equivalent to those of the charge control devices of FIG. 3. Therefore, the equivalent components are assigned with the same reference numerals.

In the present preferred embodiment, commutators 15a and 15b are interposed between the power generators 11a, 11b and the negative electrode sides of the main batteries 12a, 12b, as well as between the power generators 11a, 11b and the negative electrode side of the accessory battery 13. On the other hand, main battery thyristors 22a and 22b are interposed between the power generators 11a and 11b and the positive electrode sides of the main batteries 12a and 12b. The main battery thyristors 22a and 22b are first switching elements arranged to connect and disconnect the power generators 11a and 11b to and from the main batteries 12a and 12b. Between the power generators 11a, 11b and the positive electrode side of the accessory battery 13, accessory battery thyristors 23a and 23b are interposed. The accessory battery thyristors 23a and 23b are second switching elements arranged to connect and disconnect generated power of the power generators 11a and 11b to/from the accessory battery 13. As these first and second switching elements, without limiting to the thyristors, other power switching devices which can perform so-called ON/OFF control (for example, IGBT, etc.) can be applied.

The timing adjuster 19a of the charge control device 18a provided corresponding to the power generator 11a includes a first timing adjusting circuit 191a corresponding to the main battery thyristors 22a and a second timing adjusting circuit 192a corresponding to the accessory battery thyristors 23a. Similarly, the timing adjuster 19b of the charge control device 18b provided corresponding to the power generator 11b includes a first timing adjusting circuit 191b corresponding to the main battery thyristors 22b and a second timing adjusting circuit 192b corresponding to the accessory battery thyristors 23b. The first timing adjusting circuits 191a and 191b charge the main batteries 12a and 12b by turning the main battery thyristors 22a and 22b ON when charge permission signals are output from the main battery charge controllers 20a and 20b. In addition, the first timing adjusting circuits 191a and 191b regulate charging of the main batteries 12a and 12b by turning the main battery thyristors 22a and 22b OFF when charge stop signals are output from the main battery charge controllers 20a and 20b. Similarly, the second timing adjusting circuits 192a and 192b charge the accessory battery 13 by turning the accessory battery thyristors 23a and 23b ON when charge permission signals are output from the accessory battery charge controllers 21a and 21b. Also, the second timing adjusting circuits 192a and 192b regulate charging of the accessory battery 13 by turning the accessory battery thyristors 23a and 23b OFF when charge stop signals are output from the accessory battery charge controllers 21a and 21b.

The configuration of the main battery charge controllers 20a and 20b is preferably the same as in the first preferred embodiment as described above. In other words, the main battery charge controllers 20a and 20b detect voltages of the main batteries 12a and 12b in main battery control periods set to, for example, approximately several milliseconds, for example. Then, the main battery charge controllers 20a and 20b output charge permission signals when the main battery voltages are not more than the upper limit MUL of the main battery allowable voltage range, and otherwise, output charge stop signals. These signals are input as charge control commands into the first timing adjusting circuits 191a and 191b.

On the other hand, the accessory battery charge controllers 21a and 21b are different from those in the first preferred embodiment in that these controllers do not monitor the main battery voltages. The accessory battery charge controllers 21a and 21b detect the voltage of the accessory battery 13 in accessory battery control periods set to, for example, approximately several milliseconds. Then, the accessory battery charge controllers 21a and 21b output charge permission signals when the accessory battery voltage is not more than the upper limit AUL of the accessory battery allowable voltage range, and otherwise, output charge stop signals. These signals are input as charge control commands into the second timing adjusting circuits 192a and 192b.

In this preferred embodiment, the upper limit AUL of the accessory battery voltage and the upper limit MUL of the main battery voltage may be equal to each other. Also, the main battery control period and the accessory battery control period may be equivalent to each other. Therefore, the accessory battery charge controllers 21a and 21b can include the same analog circuits as the main battery charge controllers 20a and 20b. However, the voltage of the accessory battery 13 does not need to be controlled as strictly as the voltages of the main batteries 12a and 12b which relate to fuel injection, etc. Therefore, the accessory battery control period may be set to be longer than the main battery control period as in the case of the first preferred embodiment, for example.

Thus, according to the battery charge control device for a marine vessel of the present preferred embodiment, the power generator 11a, 11b attached to the engine 2 of the outboard motor 1 charges the main battery (12a or 12b) and the accessory battery 13 connected to the power generator 11a, 11b in parallel. The charged states of the main batteries 12a and 12b are controlled by driving the main battery thyristors (first switching elements) 22a and 22b by the main battery charge controllers 20a and 20b. On the other hand, the charged state of the accessory battery 13 is controlled by driving the accessory battery thyristors (second switching elements) 23a and 23b by the accessory battery charge controllers 21a and 21b. Accordingly, charging of the main batteries 12a and 12b and the accessory battery 13 can be properly controlled, respectively. Of course, the voltages of the main batteries 12a and 12b can be controlled to a proper range. In addition, the switching elements are divided between the main batteries 12a and 12b and the accessory battery 13, so that without using a large-size switch, limited generated power can be distributed to the side requiring power as needed depending on a situation.

As shown by the dashed line in FIG. 7, as in the case of the first preferred embodiment, the accessory battery charge controllers 21a and 21b can make data communications with each other via a communication line 40. Accordingly, the accessory battery control periods can be synchronized, so that the accessory battery voltage can be prevented from becoming excessively high.

The outboard motor to which the battery charge control device for a marine vessel of the present invention is applied is not limited to the outboard motors described in the preferred embodiments. The number of outboard motors is not necessarily 1 or 2, and the present invention is also applicable to a marine vessel including three or more outboard motors.

Also, without limiting to outboard motors, the present invention is also applicable to other propulsion devices. In addition, the marine vessel to which the battery charge control device for a marine vessel of the present invention is applied is not limited to the marine vessels described in the preferred embodiments.

A detailed description has been provided of the preferred embodiments of the present invention. However, the preferred embodiments are only specific examples to describe the technical content of the present invention, and the present invention is not to be construed as limited to these specific examples. The spirit and scope of the present invention are restricted only by the appended claims.

The present application corresponds to Japanese Patent Application No. 2008-203398 filed in the Japan Patent Office on Aug. 6, 2008, and the entire disclosure of the application is incorporated herein by reference.

What is claimed is:

1. A charge control device for a marine vessel arranged to control charging of a plurality of batteries installed in the marine vessel, the plurality of batteries including a main battery arranged to supply power for operating an engine of a propulsion device, and an accessory battery arranged to supply power for devices other than the engine, the main battery and the accessory battery being connected in parallel to a power generator attached to the engine, the charge control device comprising:
   a switching element arranged to short-circuit the power generator;
   a first control unit arranged to execute a first control to short-circuit the power generator by driving the switching element when a voltage of the main battery exceeds a first upper limit, in a first control period; and
   a second control unit arranged to execute a second control to short-circuit the power generator by driving the switching element when a voltage of the accessory battery exceeds a second upper limit, in a second control period which is longer than the first control period.

2. The battery charge control device for a marine vessel according to claim 1, wherein the second upper limit is higher than the first upper limit.

3. The battery charge control device for a marine vessel according to claim 1, wherein the second control unit is arranged to short-circuit the power generator by driving the switching element when an average accessory battery voltage exceeds the second upper limit.

4. The battery charge control device for a marine vessel according to claim 1, further comprising an invalidating unit arranged to invalidate the second control by the second control unit when a voltage of the main battery is less than a lower limit which is lower than the first upper limit.

5. The battery charge control device for a marine vessel according to claim 1, wherein the marine vessel includes a plurality of the propulsion devices, and a plurality of the main batteries are provided corresponding to the plurality of propulsion devices, respectively, and each of the main batteries is arranged to be charged by the power generator attached to the engine of a corresponding propulsion device, and the accessory battery is arranged to be charged by the plurality of power generators attached to the engines of the plurality of propulsion devices.

6. The battery charge control device for a marine vessel according to claim 5, wherein the first control unit, the second control unit, and the switching element are provided for each of the plurality of propulsion devices.

7. The battery charge control device for a marine vessel according to claim 6, wherein a plurality of the second control units provided in the plurality of propulsion devices, respectively, are arranged to exchange information with each other and to adjust driving timings of the switching element.

8. A battery charge control device for a marine vessel arranged to control charging of a plurality of batteries installed in the marine vessel, the plurality of batteries including a main battery arranged to supply power for operating an engine of a propulsion device, and an accessory battery arranged to supply power for devices other than the engine, the main battery and the accessory battery being connected in parallel to a power generator attached to the engine, the charge control device comprising:
  a switching element arranged to short-circuit the power generator;
  a main battery charge control unit arranged to execute a first control to output a charge stop signal when a voltage of the main battery exceeds a first upper limit, and stop the charge stop signal when a voltage of the main battery is not more than the first upper limit, in a first control period;
  an accessory battery charge control unit arranged to execute a second control to output a charge stop signal when a voltage of the accessory battery exceeds a second upper limit higher than the first upper limit, and stop the charge stop signal when a voltage of the accessory battery is not more than the second upper limit, in a second control period which is longer than the first control period; and
  an element control unit arranged to drive the switching element in response to the charge stop signal to stop charging of the main battery and the accessory battery by short-circuiting the power generator.

9. The battery charge control device for a marine vessel according to claim 8, further comprising an invalidating unit arranged to invalidate the second control by the accessory battery charge control unit, to open the switching element, and to charge the main battery and the accessory battery when a voltage of the main battery is less than a lower limit which is lower than the first upper limit.

10. A battery charge control device for a marine vessel arranged to control charging of a plurality of batteries installed in the marine vessel, the plurality of batteries including a main battery arranged to supply power for operating an engine of a propulsion device, and an accessory battery arranged to supply power for devices other than the engine, the main battery and the accessory battery being connected in parallel to a power generator attached to the engine, the charge control device comprising:
  a first switching element arranged to open and close a charging path between the power generator and the main battery;
  a second switching element arranged to open and close a charging path between the power generator and the accessory battery;
  a first control unit arranged to control the first switching element according to a voltage of the main battery; and
  a second control unit arranged to control the second switching element according to a voltage of the accessory battery; wherein
  the first control unit is arranged to execute a first control to open the first switching element when a voltage of the main battery exceeds a first upper limit, and close the first switching element when a voltage of the main battery is not more than the first upper limit, in a first control period, and
  the second control unit is arranged to execute a second control to open the second switching element when a voltage of the accessory battery exceeds a second upper limit, and close the second switching element when a voltage of the accessory battery is not more than the second upper limit, in a second control period.

11. A battery charge control device for a marine vessel arranged to control charging of a plurality of batteries installed in the marine vessel, the plurality of batteries including a main battery arranged to supply power for operating an engine of a propulsion device, and an accessory battery arranged to supply power for devices other than the engine, the main battery and the accessory battery being connected in parallel to a power generator attached to the engine, the charge control device comprising:
  a first switching element arranged to open and close a charging path between the power generator and the main battery;
  a second switching element arranged to open and close a charging path between the power generator and the accessory battery;
  a first control unit arranged to control the first switching element according to a voltage of the main battery; and
  a second control unit arranged to control the second switching element according to a voltage of the accessory battery; wherein
  the marine vessel includes a plurality of the propulsion devices, and a plurality of the main batteries are provided corresponding to the plurality of propulsion devices, respectively, and each of the main batteries is arranged to be charged by the power generator attached to the engine of a corresponding propulsion device, and the accessory battery is arranged to be charged by the plurality of power generators attached to the engines of the plurality of propulsion devices.

12. The battery charge control device for a marine vessel according to claim 11, wherein the first control unit, the second control unit, the first switching element, and the second switching element are provided for each of the plurality of propulsion devices.

13. The battery charge control device for a marine vessel according to claim 12, wherein a plurality of the second control units provided in the plurality of propulsion devices, respectively, are arranged to exchange information with each other and adjust driving timings of the second switching element.

14. A marine vessel comprising:
  a hull;
  a propulsion device provided in the hull and including an engine and a power generator attached to the engine;
  a main battery which is installed in the hull, and is connected to the power generator and is arranged to supply power for operating the engine of the propulsion device;
  an accessory battery which is installed in the hull and connected to the power generator in parallel to the main battery, and is arranged to supply power for devices other than the engine;
  a switching element arranged to short-circuit the power generator;
  a first control unit arranged to execute a first control to short-circuit the power generator by driving the switching element when a voltage of the main battery exceeds a first upper limit, in a first control period; and
  a second control unit arranged to execute a second control to short-circuit the power generator by driving the switching element when a voltage of the accessory battery exceeds a second upper limit, in a second control period which is longer than the first control period.

15. The marine vessel according to claim 14, wherein the second upper limit is higher than the first upper limit.

16. The marine vessel according to claim 14, further comprising an invalidating unit arranged to invalidate the second control by the second control unit when a voltage of the main battery is less than a lower limit which is lower than the first upper limit.

17. The marine vessel according to claim 14, wherein a plurality of the propulsion devices are provided in the hull, and a plurality of the main batteries are provided corresponding to the plurality of propulsion devices, respectively, and each of the main batteries is arranged to be charged by the power generator attached to the engine of a corresponding propulsion device, and the accessory battery is arranged to be charged by the plurality of power generators attached to the engines of the plurality of propulsion devices.

18. The marine vessel according to claim 17, wherein the first control unit, the second control unit and the switching element are provided for each of the plurality of propulsion devices.

19. The marine vessel according to claim 18, wherein a plurality of the second control units provided in the plurality of propulsion devices, respectively, are arranged to exchange information with each other and adjust driving timings of the switching element.

* * * * *